US007383514B2

(12) United States Patent
Walls et al.

(10) Patent No.: US 7,383,514 B2
(45) Date of Patent: Jun. 3, 2008

(54) SYSTEM AND METHOD FOR CONFIGURING GRAPHICS PIPELINES IN A COMPUTER GRAPHICAL DISPLAY SYSTEM

(75) Inventors: Jeffrey J. Walls, Fort Collins, CO (US); James A. Schinnerer, Fort Collins, CO (US); Jason A. Daughenbaugh, Bozeman, MT (US); Donley B. Hoffman, Fort Collins, CO (US); Kevin T. Lefebvre, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 603 days.

(21) Appl. No.: 11/120,245

(22) Filed: May 2, 2005

(65) Prior Publication Data

US 2005/0193352 A1 Sep. 1, 2005

Related U.S. Application Data

(63) Continuation of application No. 10/028,868, filed on Dec. 21, 2001, now Pat. No. 6,920,618.

(51) Int. Cl.
*G06F 3/00* (2006.01)
*G06T 1/20* (2006.01)

(52) U.S. Cl. ............... 715/771; 715/840; 715/835; 345/506

(58) Field of Classification Search ............... 715/771, 715/835, 840; 345/506
See application file for complete search history.

(56) References Cited

U.S. PATENT DOCUMENTS 5,757,385 A * 5/1998 Narayanaswami et al. .. 345/505
5,801,716 A * 9/1998 Silverbrook ................ 345/506
6,075,917 A * 6/2000 Kim ............................ 386/47
6,249,294 B1 * 6/2001 Lefebvre et al. ............ 345/504
6,329,996 B1 * 12/2001 Bowen et al. ............... 345/506
6,331,852 B1 * 12/2001 Gould et al. ................ 345/419
6,529,198 B1 * 3/2003 Miyauchi .................... 345/505
6,717,599 B1 * 4/2004 Olano ......................... 715/853
2003/0160792 A1 * 8/2003 Alcorn ........................ 345/502
2003/0210271 A1 * 11/2003 King .......................... 345/771
2003/0231215 A1 * 12/2003 Day ............................ 345/835
2004/0169671 A1 * 9/2004 Aronson et al. ............. 345/700
2004/0217964 A1 * 11/2004 Ono ............................ 345/545

OTHER PUBLICATIONS

Lefebvre, Kevin T, Whitepaper entitled, "HP Visualization Center SV6", Hewlett-Packard Company, May 2001, 10 pages.*
Humphreys, Greg, et al. "WireGL: A Scalable Graphics System for Clusters", ACM Siggraph 2001, Aug. 2001, 12 pages.*

* cited by examiner

*Primary Examiner*—Sy D Luu

(57) ABSTRACT

A system and method for configuring a plurality of graphics pipelines in a computer graphical display system is disclosed. The method comprises displaying a graphical user interface to enable a user to graphically specify at least one parameter for a plurality of pipe rectangles of the computer graphical display system, each of the plurality of pipe rectangles being associated with at least one of the plurality of graphics pipelines, receiving the at least one parameter, and updating a compositor of the computer graphical display system in real-time based at least in part on the at least one parameter.

31 Claims, 6 Drawing Sheets

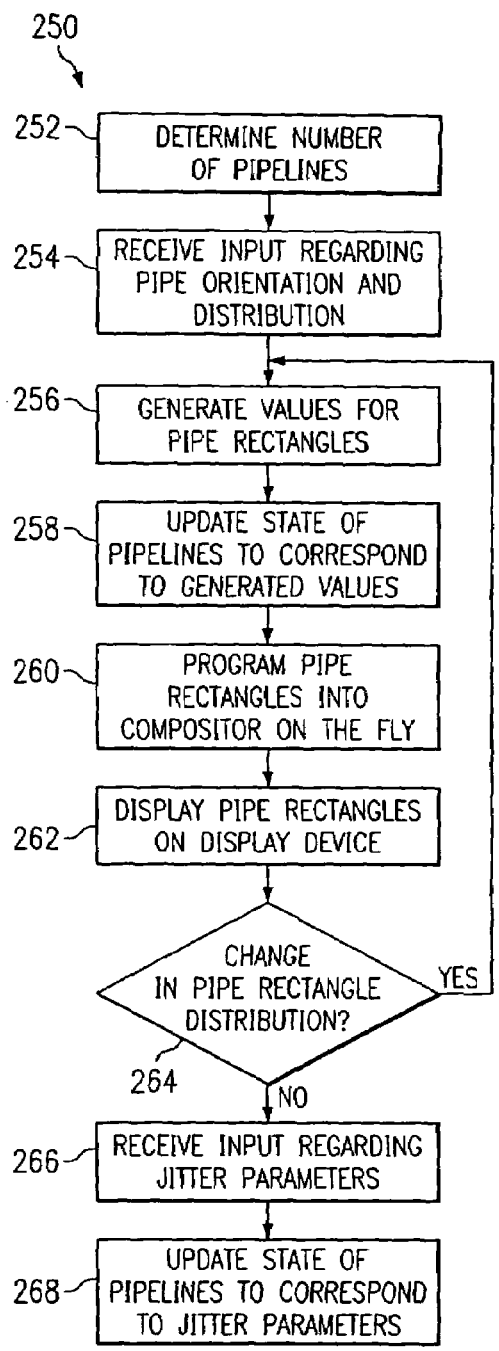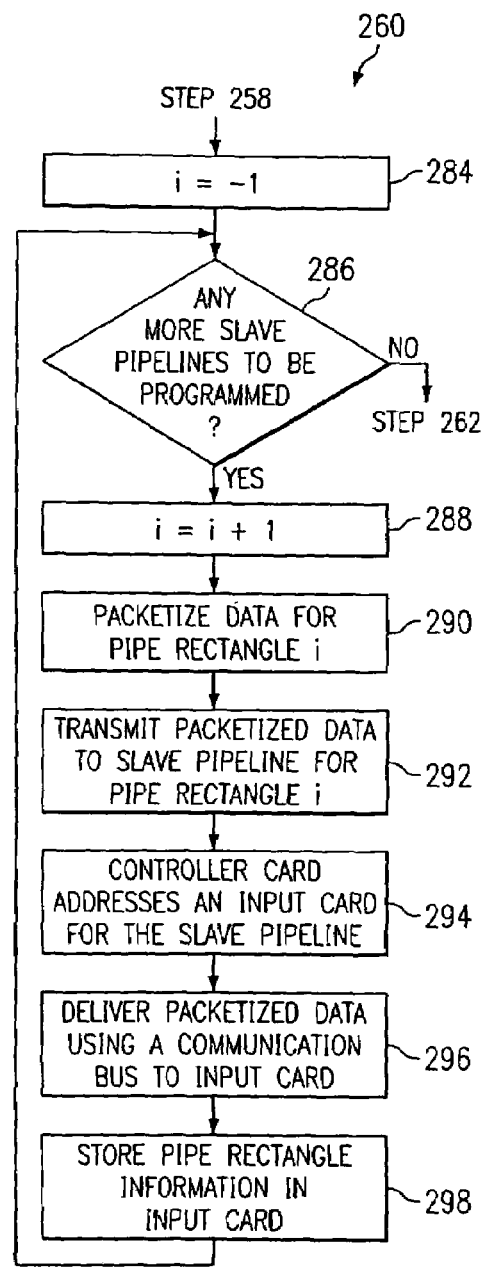
FIG. 7
FIG. 9

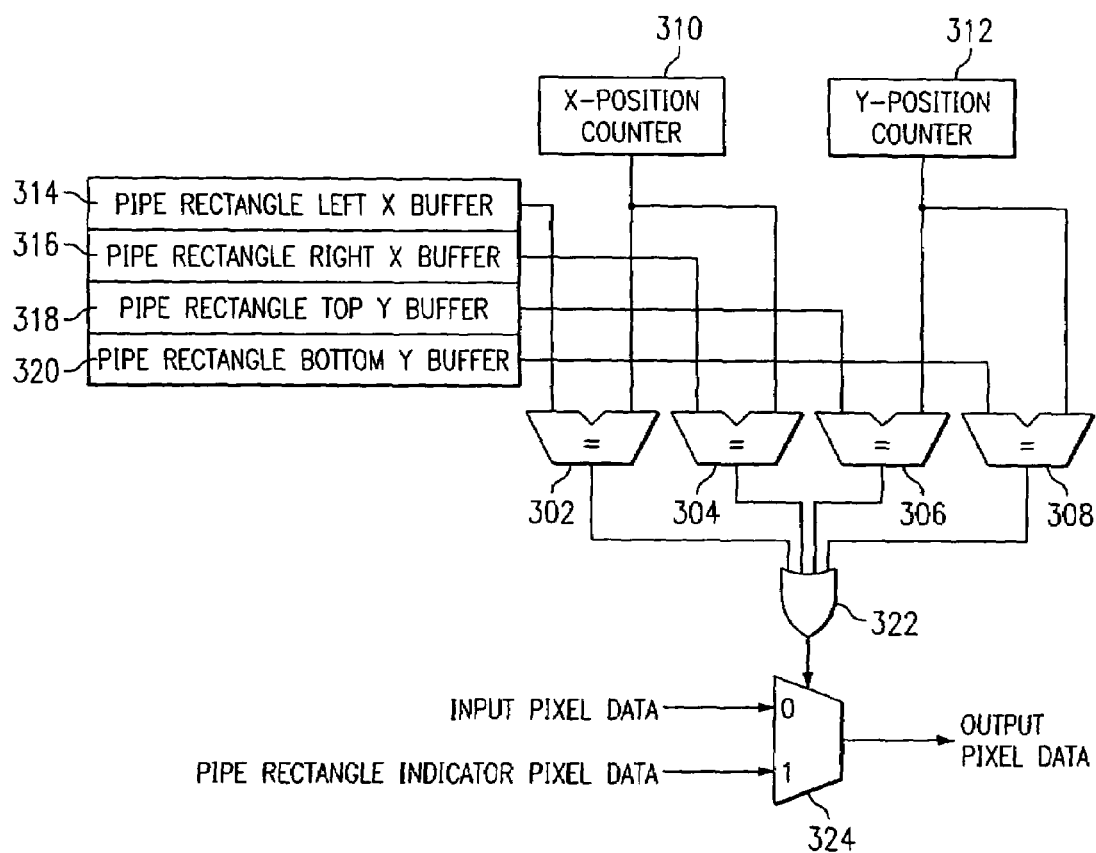

SYSTEM AND METHOD FOR CONFIGURING GRAPHICS PIPELINES IN A COMPUTER GRAPHICAL DISPLAY SYSTEM

CROSS-REFERENCE TO RELATED APPLICATIONS

This patent application is continuation of U.S. Pat. application Ser. No. 10/028,868, entitled "SYSTEM AND METHOD FOR CONFIGURING GRAPHICS PIPELINES IN A COMPUTER GRAPHICAL DISPLAY SYSTEM" filed on Dec. 21, 2001; now U.S. Pat. No. 6,920,618 which is related to co-pending U.S. Pat. application Ser. No. 09/715,746, entitled "SINGLE LOGICAL SCREEN SYSTEM AND METHOD FOR RENDERING GRAPHICAL DATA," filed on Nov. 17, 2000; U.S. Pat. application Ser. No. 09/715,892, entitled "SYSTEMS FOR COMPOSITING GRAPHICAL DATA," filed on Nov. 17, 2000; U.S. Pat. application Ser. No. 09/715,335, entitled "SYSTEM AND METHOD FOR EFFICIENTLY RENDERING GRAPHICAL DATA," filed on Nov. 17, 2000; U.S. Pat. application Ser. No 09/715,253, entitled "SYSTEM AND METHOD FOR EFFICIENTLY RENDERING A JITTER ENHANCED GRAPHICAL IMAGE," filed on Nov. 17, 2000; U.S. Pat. application Ser. No. 09/715,882, entitled "SYSTEMS AND METHODS FOR RENDERING GRAPHICAL DATA," filed on Nov. 17, 2000; and U.S. Pat. application Ser. No. 10/705,094, entitled "SYSTEM AND METHOD FOR AUTOMATICALLY CONFIGURING GRAPHICS PIPELINES BY TRACKING A REGION OF INTEREST IN A COMPUTER GRAPHICAL DISPLAY SYSTEM" filed on Nov. 17, 2000.

TECHNICAL FIELD OF THE INVENTION

The present invention relates generally to the field of computer graphical display systems, and more particularly to a system and method for configuring graphics pipelines in a computer graphical display system.

BACKGROUND OF THE INVENTION

Computer graphical display systems are commonly used for displaying graphical representations of two-dimensional and/or three-dimensional objects on a two-dimensional display device, such as a cathode ray tube.

In existing computer graphical display systems, a graphics application stored on a processor-based system, such as a computer, defines an object to be rendered by the computer graphical display system. In order to render the object, the application transmits graphics data defining the object to a graphics pipeline, which may be implemented in hardware, software, or a combination thereof. The graphics pipeline via well-known techniques processes the graphics data received from the application and stores the graphics data in a frame buffer. The frame buffer stores the graphics data to define the image to be displayed by a display device. The frame buffer is used to store a set of data for each pixel displayed by the display device. Each set of data includes the color value of the corresponding pixel as well as any additional information needed to appropriately color or shade the identified pixel, such as transparency and depth values. Each set of data is correlated with the coordinate values that identify a pixel position on the display device. The frame buffer transmits the graphics data stored therein to the display device via a scanning process such that each line of pixels defining the image displayed by the display device is consecutively updated.

Multiple display devices may be used to display a single large image in which each display device displays a portion of the large image. In such an embodiment, the multiple display devices are treated as a single logical display device or screen, and different portions of an image may be rendered by the different display devices. Each of the multiple display devices may be associated with different computer systems and the multiple computer systems may be interconnected via a computer network, such as a Local Area Network (LAN). An X Window System is a standard for implementing window-based user interfaces in a networked computer environment and it may be desirable to utilize X Protocol in rendering graphics data in a networked computer system. A more detailed discussion of the X Window System and the X Protocol that defines it may be found in *X Protocol Reference Manual Volume Zero* (O'Riley & Associates 1990) by Adrian Nye.

Although it is possible to render and display two-dimensional and three-dimensional data in conventional computer graphical display systems, there exists limitations that restrict the performance and image quality exhibited by such systems. High quality images, particularly three-dimensional images, are typically defined by a large amount of graphics data and the speed at which conventional graphics pipelines can process the graphics data defining an object is limited. The above-referenced patent application, entitled "SYSTEM AND METHOD FOR EFFICIENTLY RENDERING GRAPHICAL DATA" describes a computer graphical display system and method for efficiently utilizing a plurality of graphics pipelines to render graphics data for a display device. However, a user of existing computer graphical display systems does not have control over the management and use of the graphics pipelines used in the system.

SUMMARY OF THE INVENTION

In accordance with an embodiment of the present invention, a method for configuring a plurality of graphics pipelines in a computer graphical display system is disclosed. The method comprises displaying a graphical user interface to enable a user to graphically specify at least one parameter for a plurality of pipe rectangles of the computer graphical display system, each of the plurality of pipe rectangles being associated with at least one of the plurality of graphics pipelines, receiving the at least one parameter, and updating a compositor of the computer graphical display system in real-time based at least in part on the at least one parameter.

In accordance with another embodiment of the present invention, a system for configuring a plurality of graphics pipelines in a computer graphical display system is disclosed. The system comprises a graphical user interface. The graphical user interface comprises a plurality of jitter sample icons, each of the plurality of jitter sample icons corresponding to the number of jitter values in a plurality of jitter values used for a plurality of pipe rectangles of the computer graphical display system. The graphical user interface also comprises a plurality of orientation icons, each of the plurality of orientation icons corresponding to a different orientation of the plurality of pipe rectangles based at least in part on the number of graphics pipelines in the computer graphical display system.

In accordance with yet another embodiment of the present invention, a method for configuring a plurality of graphics pipelines in a computer graphical display system is disclosed. The method comprises displaying a graphical user interface to enable a user to graphically specify at least one parameter for a plurality of pipe rectangles of the computer graphical display system, each of the plurality of pipe rectangles being associated with at least one of the plurality of graphics pipelines; receiving the at least one parameter; generating coordinate values for each of the plurality of pipe rectangles based at least in part on the at least one parameter and at least in part on a screen size of a display device of the computer graphical display system and updating a compositor of the computer graphical display system in real-time based at least in part on the generated coordinate values.

BRIEF DESCRIPTION OF THE DRAWINGS

For a more complete understanding of the present invention, the objects and advantages thereof, reference is now made to the following descriptions taken in connection with the accompanying drawings in which:

FIG. 7 is a flowchart of a method for configuring pipelines in a computer graphical display system in accordance with an embodiment of the present invention;

FIG. 9 is a flowchart of a method for programming pipe rectangles into a compositor of the computer graphical display system in accordance with an embodiment of the present invention; and FIG. 10 is a schematic diagram of a display-enabling device for displaying the pipe rectangles on a display device of the computer graphical display system in accordance with an embodiment of the present invention.

DETAILED DESCRIPTION OF THE DRAWINGS

The preferred embodiment of the present invention and its advantages are best understood by referring to FIGS. 1 through 10 of the drawings, like numerals being used for like and corresponding parts of the various drawings.

In general, the present invention pertains to a graphical software tool that enables a user to graphically define different parameters, such as orientation, distribution, jitter values and/or the like, for one or more pipelines in a multi-pipeline graphical display system to obtain in real-time a desired rendering of graphics image data on a display device of the graphical display system.

Figure 1:
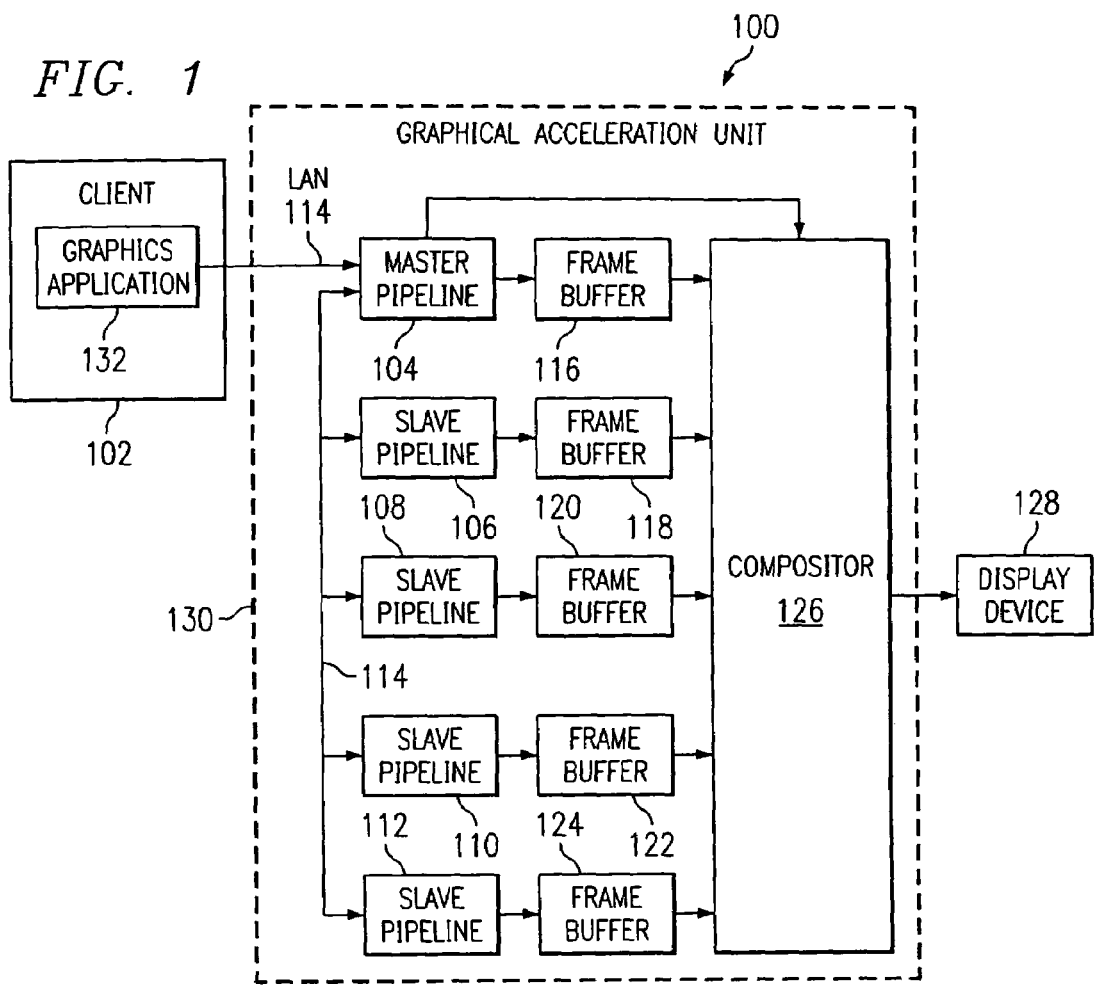
FIG. 1 is a block diagram of an exemplary embodiment of a computer graphical display system on which the teachings of the present invention may be practiced.

FIG. 1 is a block diagram of an exemplary embodiment of a graphical display system 100 on which the teachings of the present invention may be practiced. System 100 comprises a client 102 coupled to master pipeline 104, which is coupled to slave pipelines 106-112, preferably via a Local Area Network (LAN) 114. The terms "pipelines" and "graphics pipelines" are used interchangeably herein. However, other types of interconnection circuitry or computer networks may be utilized without departing from the scope of the present invention. System 100 also preferably comprises one or more frame buffers 116-124 coupled between respective ones of the pipelines 104-112 and a compositor 126. Preferably, master pipeline 104 is also coupled to compositor 126. Compositor 126 is coupled to a display device 128. Pipelines 104-112, frame buffers 116-124, and compositor 126 are collectively referred to herein as a graphical acceleration unit 130. It should be noted that the embodiment shown in FIG. 1 depicts four slave pipelines 106-112 for illustrative purposes only. Any number of slave pipelines 106-112 may be employed without departing from the scope of the present invention.

Client 102 comprises a graphics application 132 and may be implemented in hardware, software or any combination thereof. Pipelines 104-112 may be implemented in hardware, software or any combination thereof In the preferred embodiment, client 102 and each of the pipelines 104-112 are respectively implemented via computer systems. Such computer systems may be stand alone computer systems, for example computer systems commonly referred to as "computer workstations." However, the invention is not so limited and other types of computer systems, now known or later developed, may be used. Thus, for example, system 100 as shown in FIG. 1 may be implemented via six computer workstations (i.e., one computer workstation for client 102 and one computer workstation for each of the pipelines 104-112). However, it is possible to implement client 102 and pipelines 104-112 using other configurations. As an example, client 102 and master pipeline 104 may be implemented via a single computer workstation. Any computer workstation used to implement client 102 and/or pipelines 104-112 may be utilized to perform other desired functionality when the workstation is not being used to render graphics data.

In operation, master pipeline 104 receives graphics data from application 132. Master pipeline 104 preferably renders two-dimensional (2D) graphics data to frame buffer 116 and routes three-dimensional (3D) graphics data to slave pipelines 106-112, which render the 3D graphics data to frame buffers 118-124, respectively. Client 102 and pipelines 104-112 are described in more detail hereinafter.

Each frame buffer 116-124 outputs a stream of graphics data to compositor 126. Compositor 126 is configured to combine or composite each of the data streams from frame buffers 116-124 into a single data stream that is provided to display device 128, which may be a Cathode Ray Tube (CRT), a Liquid Crystal Display (LCD), a Thin Film Transistor (TFT), a Light Emitting Diode (LED), organic polymers and/or the like now known or later developed. Although in FIG. 1, display device 128 is shown as a single display device, the invention is not so limited and in alternative embodiments, display device 128 may comprise more than one display device acting as a single logical display device. In such an embodiment, each display device may be coupled to a separate graphical acceleration unit, each graphical acceleration unit being coupled to the same client.

Referring to FIG. 1, the graphics data provided to display device 128 by compositor 126 defines the image to be displayed by display device 128 and is based on the graphics data received from frame buffers 116-124. Compositor 126 is described in more detail hereinafter.

Figure 2:
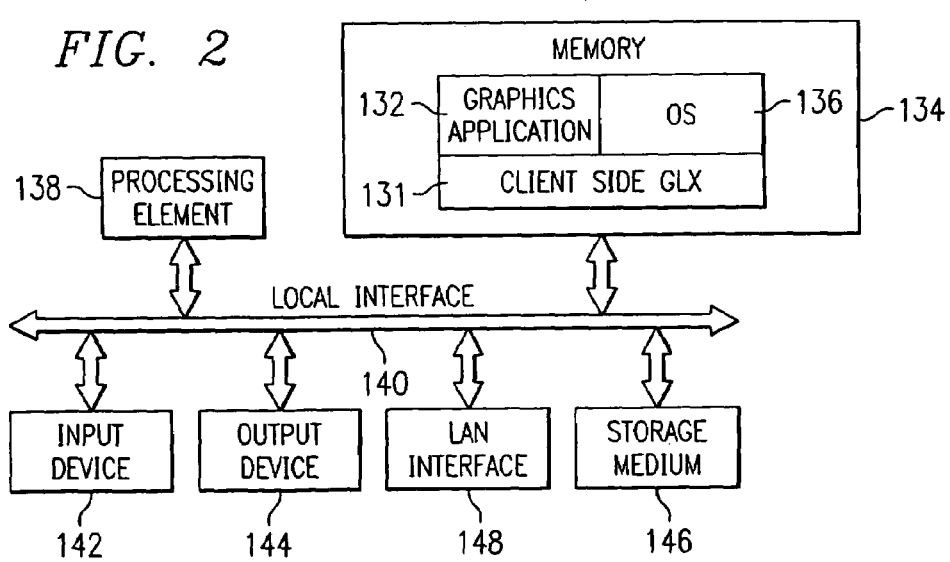
FIG. 2 is a block diagram of a more detailed view of a client depicted in FIG. 1.

FIG. 2 is a block diagram of a more detailed view of client 102. Client 102 preferably stores graphics application 132 in memory 134. Memory 134 may also store an operating system 136, which performs functionality similar to conventional operating systems. Operating system 136 controls the resources of client 102 through conventional techniques and interfaces the instructions of application 132 with a processing element 138 as necessary to enable application 132 to properly run. Processing element 138 preferably communicates with and drives other elements within client 102 via a local interface 140, which may include one or more buses. Client 102 may also comprise at least one input device 142, for example, a keyboard, a mouse, and/or the like, now known or later developed, coupled to local interface 140 to input data from a user of client 102. Client 102 may also comprise at least one output device 144, for example, a display device, a printer, and/or the like, now known or later developed, coupled to local interface 140 to output data. Client 102 may also comprise a storage medium 146 to store data. Storage medium 146 may be any storage medium now known or later developed. Storage medium 146 may be coupled to local interface 140 to transfer data to and from the storage medium. A LAN interface 148 coupled to local interface 140 may be provided to allow client 102 to exchange data with LAN 114 (FIG. 1).

In the preferred embodiment, X Protocol is generally utilized to render 2D graphics data, and OpenGL Protocol (OGL) is generally utilized to render 3D graphics data, although other types of protocols may be utilized in other embodiments. By way of background, OpenGL Protocol is a standard application programmer's interface (API) to hardware that accelerates 3D graphics operations. Although OpenGL Protocol is designed to be window system independent, it is often used with window systems, such as the X Window System, for example. In order that OpenGL Protocol may be used in an X Window System environment, an extension of the X Window System has been developed called GLX. For more complete information on the GLX extension to the X Window System and on how OpenGL Protocol can be integrated with the X Window System, see for example Mark J. Kilgard, OpenGL Programming for the X Window System (Addison-Wesley Developers Press 1996). Memory 134 comprises a client side GLX layer 131. When application 132 issues a graphical command, client side GLX layer 131 of client 102 transmits the command over LAN 114 to master pipeline 104.

Figure 3:
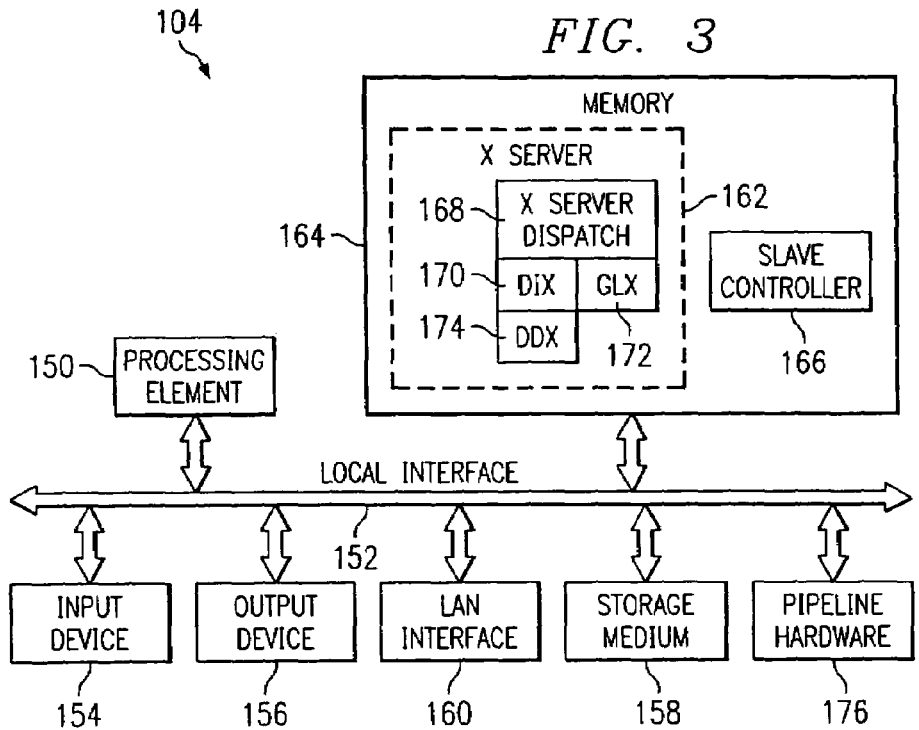
FIG. 3 is a block diagram of a more detailed view of a master pipeline depicted in FIG. 1.

FIG. 3 is a block diagram of a more detailed view of master pipeline 104. Master pipeline 104 comprises one or more processing elements 150 coupled to a local interface 152, which may include one or more buses. Processing element 150 preferably communicates with and drives other elements within master pipeline 104 via a local interface 152, which may include one or more buses. Master pipeline 104 may also comprise at least one input device 154, for example, a keyboard, a mouse, and/or the like, now known or later developed, coupled to local interface 152 to input data. Master pipeline 104 may also comprise at least one output device 156, for example, a display device, a printer, and/or the like, now known or later developed, coupled to local interface 152 to output data. Master pipeline 104 may also comprise a storage medium 158 to store data. Storage medium 158 may be any storage medium now known or later developed. Storage medium 158 may be coupled to local interface 152 to transfer data to and from the storage medium. LAN interface 160 coupled to local interface 152 may be provided to allow master pipeline 104 to exchange data with LAN 114.

Master pipeline 104 preferably also comprises memory 164. Memory 164 comprises an X server 162 and a slave controller 166. X server 162 may be implemented in software, hardware, or a combination thereof. In the embodiment shown in FIG. 3, X server 162 is implemented in software.

X server 162 comprises an X server dispatch layer 168, a device independent layer (DIX) 170, a GLX layer 172 and a device dependent layer (DDX) 174. In the preferred embodiment, X server 162 renders 2D X window commands, such as commands to create or move an X window. X server dispatch layer 168 is designed to route received commands to DIX layer 170 or to GLX layer 172. An X window command that does not include 3D data is interfaced with DIX, whereas an X window command that includes 3D data (e.g., an X command having embedded OpenGL Protocol, such as a command to create or change the state of a 3D image within an X window) is routed to GLX layer 172. A command interfaced with DIX layer 170 is executed by the DIX layer 170 and potentially by DDX layer 174, which drives graphics data associated with the executed command through a pipeline hardware 176 to frame buffer 116. A command interfaced with GLX layer 172 is transmitted by GLX layer 172 across LAN 114 to slave pipelines 106-112. One or more of the slave pipelines 106-112 executes the command and drives graphics data associated with the command to one or more frame buffers 118-124.

Figure 4:
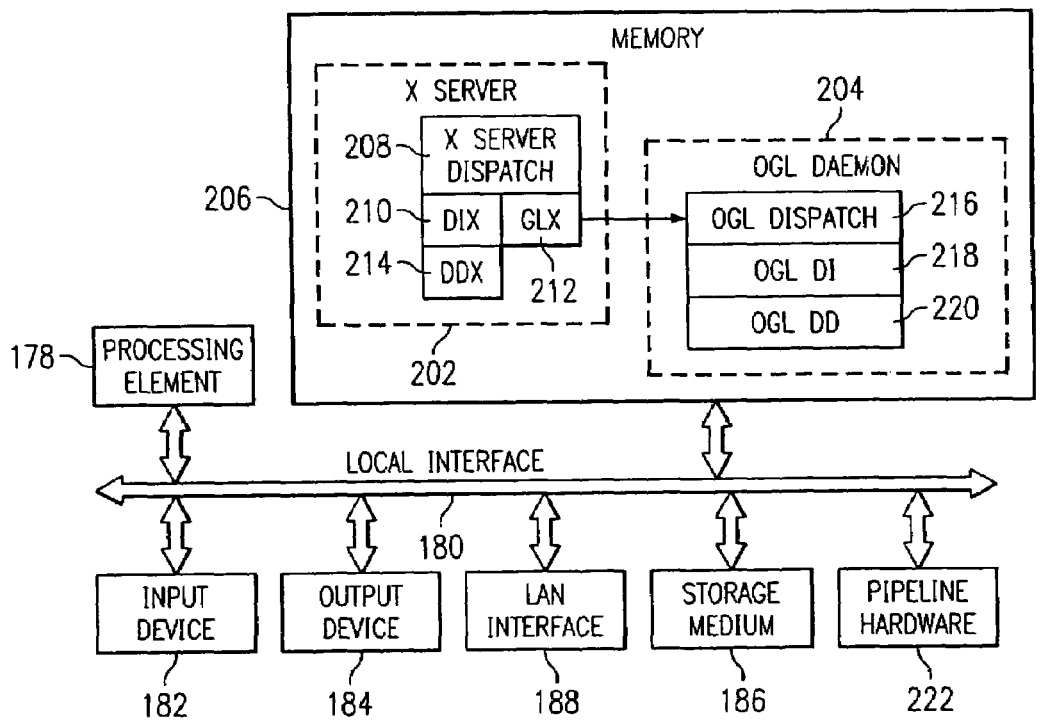
FIG. 4 is a block diagram of a more detailed view of a slave pipeline depicted in FIG. 1.

In the preferred embodiment, each of the slave pipelines 106-112 is configured according to FIG. 4. Each of the slave pipelines 106-112 comprises one or more processing elements 178 coupled to a local interface 180, which may include one or more buses. Processing element 178 preferably communicates with and drives other elements within slave pipeline 106-112 via local interface 180 which may include one or more buses. Each slave pipeline 106-112 may also comprise at least one input device 182, for example, a keyboard, a mouse, and/or the like, now known or later developed, coupled to local interface 180 to input data. Each slave pipeline 106-112 may also comprise at least one output device 184, for example, a display device, a printer, and/or the like, now known or later developed, coupled to local interface 180 to output data. Each slave pipeline 106-112 may also comprise a storage medium 186 to store data. Storage medium 186 may be any storage medium now known or later developed. Storage medium 186 may be coupled to local interface 180 to transfer data to and from the storage medium. A LAN interface 188 coupled to local interface 180 may be provided to allow slave pipelines 106-112 to exchange data with LAN 114.

Each slave pipeline 106-112 preferably also comprises memory 206. Memory 206 comprises an X server 202 and an OGL Daemon 204. X server 202 and OGL daemon 204 may be implemented in software, hardware, or a combination thereof. In the embodiment shown in FIG. 4, X server 202 and OGL daemon 204 are implemented in software.

X server 202 comprises an X server dispatch layer 208, a device independent layer (DIX) 210, a GLX layer 212, and a device dependent layer (DDX) 214. OGL daemon 204 preferably comprises an OGL dispatch layer 216, an OGL Device Independent (DI) layer 218 and an OGL Device Dependent (DD) layer 220.

In the preferred embodiment, each command received by slave pipelines 106-112 includes 3D graphics data, since X server 162 of master pipeline 104 executes each X window command that does not include 3D graphics data. X server dispatch layer 208 interfaces the 2D data of any received commands with DIX layer 210 and interfaces the 3D data of any received commands with GLX layer 212. DIX and DDX layers 210 and 214 are configured to process or accelerate the 2D data and to drive the 2D data through pipeline hardware 176 to one of the frame buffers 118-124 (FIG. 1).

GLX layer 212 interfaces the 3D data with OGL dispatch layer 216 of the OGL daemon 204. OGL dispatch layer 216 interfaces this data with OGL DI layer 218. OGL DI layer 218 and DD layer 220 are configured to process the 3D data and to accelerate or drive the 3D data through pipeline hardware 222 to one of the frame buffers 118-124 (FIG. 1). Thus, the 2D graphics data of a received command is processed or accelerated by X server 202, and the 3D graphics data of the received command is processed or accelerated by OGL daemon 204. For a more detailed description of the foregoing process of accelerating 2D data via an X server 202 and of accelerating 3D data via an OGL daemon 204, refer to commonly-assigned U.S. Pat. No. 6,249,294, entitled "3D GRAPHICS IN A SINGLE LOGICAL SCREEN DISPLAY USING MULTIPLE COMPUTER SYSTEMS".

Referring again to FIG. 1, slave pipelines 106-112, based on inputs from master pipeline 104, are configured to render 3D images based on the graphics data from master pipeline 104 according to one of three modes of operation: accelerate mode, jitter mode and mixed mode. Each slave pipeline 106-112 is responsible for rendering a specific portion of the image to be displayed on display device 128. Thus, the screen associated with display device 128 is divided into different pipe portions, the image for each pipe portion being rendered by at least one of slave pipelines 106-112. The pipe portions are preferably rectangular in shape and as such the term pipe rectangles will be used herein to refer to pipe portions. However, the invention is not so limited and the pipe portions may be of any shape.

In the accelerate mode, each slave pipeline 106-112 renders a different portion of a 3D image such that the overall process of rendering the 3D image is faster. In the jitter mode, each slave pipeline 106-112 renders the same 3D image but slightly offsets each rendered 3D image with a different offset value. Compositor 126 averages the pixel data of each pixel for the 3D images rendered by pipelines 106-112 in order to produce a single 3D image of increased image quality. In the mixed mode, one or more of the slave pipelines render the same portion(s) of the 3D image but slightly offset the common portion(s) with a different offset value. In the mixed mode, the overall process of rendering the 3D image is faster than in the jitter mode because the work of rendering is divided among multiple pipelines. The image quality of at least a portion of the rendered 3D image is better than the image quality in the accelerate mode because jittering is used.

In existing graphical display systems, a user of the graphical display system has limited control over the orientation, distribution and jitter parameters of the different pipelines used. Moreover, existing graphical display systems do not allow a user to easily switch between different configurations, such as modes of operation, distribution of pipe rectangles, jitter values, and/or the like. In order to change from a particular configuration to a different configuration, the user has to stop operating in the existing configuration, shut down the system and then operate in the new configuration. Thus, for example, if the user wants to switch from an accelerate mode to a mixed mode in the middle of a presentation, the user has to stop its presentation in the accelerate mode, shut down the system, reset the system to operate in the mixed mode and then continue the presentation in the mixed mode.

Figure 5A:
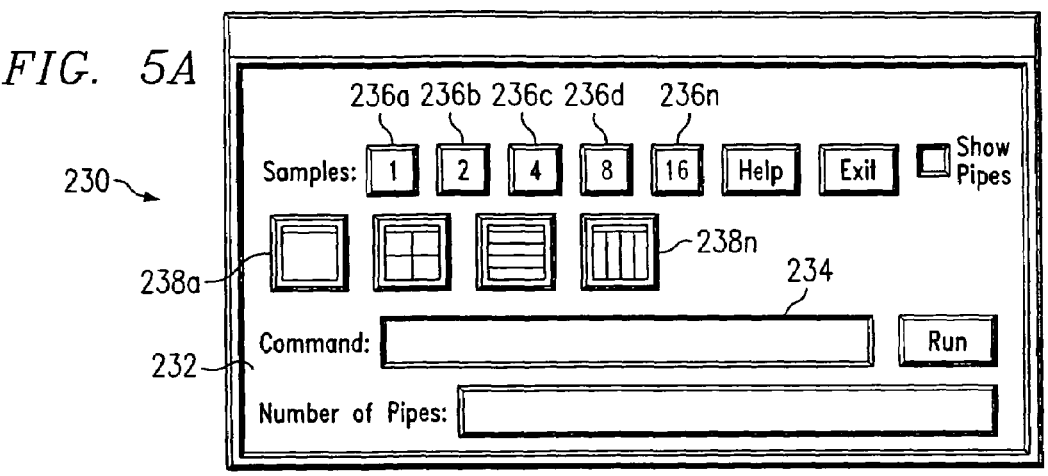
FIGS. 5A and 5B are exemplary partial screen displays of a preferred embodiment of a graphical software tool consistent with the teachings of the present invention.
Figure 5B:
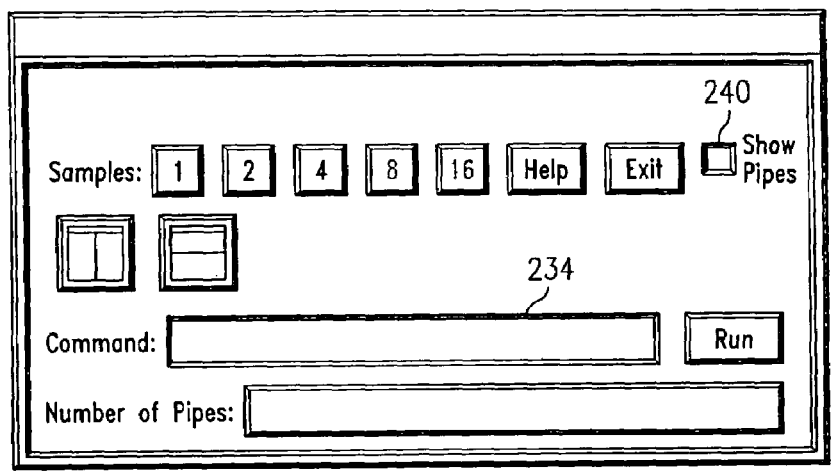

FIGS. 5A and 5B are exemplary partial screen displays of a preferred embodiment of a graphical software tool 230 consistent with the teachings of the present invention that provides the user with greater control over the different pipelines. Graphical software tool 230 preferably has a graphical user interface 232. Graphical user interface 232 comprises a plurality of jitter sample icons 236a-236n corresponding to a plurality of jitter samples, preferably starting from 1. The number of jitter samples determines the number of slave pipelines working on the same portion of the 3D image. The user may select an icon from sample icons 236a-236n depending on the number of jitter samples desired. If the user desires no jittering, the user may select a sample icon corresponding to a jitter sample of 1. Selection of a sample icon corresponding to a jitter sample of 1 instructs all slave pipelines 106-112 to operate in the accelerate mode. If the user desires to have the best possible image quality, the user may select a sample icon corresponding to the maximum number of jitter samples. Selection of a sample icon corresponding to the maximum number of jitter samples instructs all slave pipelines 106-112 to operate in the jitter mode and each slave pipeline renders the entire 3D image. Preferably, the maximum number of jitter samples is equal to the number of slave pipelines and the number of jitter samples permitted is between 1 and the number of slave pipelines. Thus, for example, if the number of slave pipelines is four, then in the illustrated embodiment sample icons 236d and 236n corresponding to 8 and 16 jitter samples respectively are disabled or omitted as a graphical display system with four slave pipelines may not have more than four jitter samples.

The number of pipe rectangles into which a screen may be divided is given by:

Number of pipe rectangles=Number of slave pipelines/Number of jitter samples

Table I shows the values of the number of jitter samples and the number of pipe rectangles in a system with 16 slave pipelines.

TABLE I

| Number of Jitter Samples | 1 | 2 | 4 | 8 | 16 |
|---|---|---|---|---|---|
| Number of Pipe Rectangles | 16 | 8 | 4 | 2 | 1 |

Graphical user interface 232 also preferably comprises a plurality of orientation icons 238a-238n. Orientation icons 238a-238n allow the user to select the orientation of different pipe rectangles. The displayed orientation icons 238a-238n may be updated in real-time by graphical software tool 230 based at least in part on the number of jitter samples selected by the user and the number of slave pipelines 106-112. For example, if there are four slave pipelines and the number of jitter samples selected by the user is two, graphical user interface 232 may display a reduced set of available pipeline orientations as shown in FIG. 5B. The user may select a desired pipe orientation, for example by clicking on an orientation icon 238a-238n. When the user selects a pipe orientation, graphical software tool 230 notifies master pipeline 104 so that master pipeline 104 may update the pipe orientation in graphical display system 100. Thus, the user may update the pipe orientation in real-time and is able to determine which pipe orientation is best suited to the graphics data currently being displayed.

Therefore, using graphical user interface 232, the user may define different parameters by simply pointing and clicking on different graphical representations, such as icons, buttons, and/or the like, associated with graphical user interface 232 and entering a minimal amount of information. Graphical software tool 230 automatically performs various tasks required to facilitate rendering of graphics data on display device 128 based at least in part on the input provided by the user. Preferably, graphical user interface 232 also allows the user to adjust the size and position of pipe rectangles for the different pipelines 106-112 by simply clicking and dragging pipe rectangle boundary indicators of the pipe rectangles themselves. Graphical software tool 230 enables the user to easily change from one configuration to another.

In operation, graphical software tool 230 queries master pipeline 104 to determine the number of slave pipelines in system 100 and displays the determined number of pipelines on graphical user interface 232. Graphical user interface 232 preferably comprises a command line prompt 234 for the user to enter a command. If desired, utilizing command line prompt 234 the user may manually enter an orientation or distribution for the pipelines.

Figure 6:
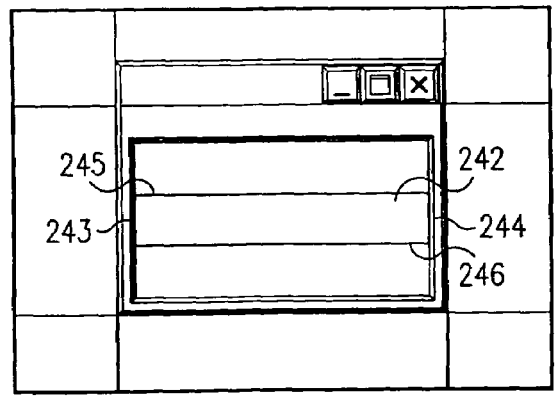
FIG. 6 is an exemplary screen display of a computer graphical display system consistent with the teachings of the present invention.

As shown in FIGS. 5A and 5B, graphical user interface 232 also preferably comprises a Show Pipes option 240. The user may select show pipes option 240 to turn pipe rectangle boundary indicators 243-246 for a pipe rectangle 242 ON as shown in FIG. 6. By selecting one or more of the pipe rectangle boundary indicator(s) 243-246 and dragging the selected pipe rectangle boundary indicator(s), the user may resize a pipe rectangle, if desired. The user may specify pipe distribution by inputting a command in command line prompt 234. For example, the user may specify an X distribution of 30% and 70% and a Y distribution of 20% and 80% by inputting the following command in command line prompt 234:

setpipes-x_dist 30 70 and -y_dist 20 80.

If desired, the pipe distribution may be specified in a control file and read from the control file. Pipe distribution determines the dimensions of each pipe rectangle and is preferably specified in terms of percentages of display device 128 along the x-axis and in terms of percentages of display device 128 along the y-axis.

FIG. 7 is a flowchart 250 of a method for configuring pipelines in a computer graphical display system, such as system 100 (FIG. 1), in accordance with an embodiment of the present invention. In step 252, the number of pipelines is determined. Preferably, graphical software tool 230 queries GLX layer 172 to determine the number of slave pipelines. Once the number of available pipelines is determined, software tool 230 may display the number of available pipelines on graphical user interface 232. Preferably, the number of available pipelines is equal to the total number of slave pipelines 106-112. However, in some cases one or more of the slave pipelines may be unavailable, for example due to defects in the unavailable pipelines. If desired, software tool 230 may also modify graphical user interface 232 based at least in part on the number of available pipelines. For example, if the number of available pipelines is four, software tool 230 may disable sample icons 236*d* and 236*n* corresponding to sample values of greater than four.

In step 254, input is received, preferably from the user and preferably by graphical software tool 230. Such user input may include, for example, the number of jitter samples, pipe rectangle orientation, pipe rectangle distribution, and/or the like. In step 256, values for pipe rectangles are generated, preferably by graphical software tool 230. Preferably, graphical software tool 230 calculates coordinate values corresponding to display device 128 for each pipe rectangle based on one or more of the following criteria: screen size, boundary conditions of pipe rectangles, hardware limitations, and/or the like. For example, for a graphical display system with four slave pipelines, if the user input specifies an X distribution of 30% and 70% and a Y distribution of 20% and 80%, then the coordinate values for the pipe rectangles would be different depending on the size of display device 128. Thus, for a 1600×1200 pixel display, the x-coordinate values would be 0, 480 (30% of 1600) and 1600 and the y-coordinate values would be 0, 320 (20% of 1200) and 1200.

Pipe rectangle boundary conditions preferably specify conditions that have to be specified at the boundary of two or more pipe rectangles. For example, the boundary conditions may specify that the X distribution needs to be on coordinate boundaries divisible by four. For a display with 1500 pixels along the X axis, an X distribution of 31% and 69% would result in a boundary value of 465 (31% of 1500). In such a case, software tool 230 would round up the unacceptable boundary value to the nearest acceptable boundary value. In step 256, graphical software tool 230 may also perform data integrity checks. For example, graphical software tool 230 may check to see whether the user has allocated 100% of the screen.

In step 258, the state of the pipelines is updated to correspond to the generated pipe rectangle values. The pipelines may already be operating with preset default values, for example vertical orientation with even distribution. In step 258, software tool 230 converts the generated pipe rectangle values to a format suitable for GLX layer 172 and transmits the generated pipe rectangle values to GLX layer 172. GLX layer 172 updates the state of each of the pipelines with the generated pipe rectangle values indicating the orientation and distribution for the respective pipelines.

In step 260, the pipe rectangles are programmed into compositor 126, preferably on the fly. GLX layer 172 converts the pipe rectangle data into a format suitable for X server 162. GLX layer 172 then transmits the pipe rectangle data to X server 162. X server 162 preferably programs compositor 126 so that compositor 126 is aware of the pipe rectangles associated with the different pipelines. A system and method for programming the pipe rectangles into compositor 126 is described in more detail herein especially with reference to FIG. 9.

In step 262, pipe rectangles with the respective pipe rectangle boundary indicators may be displayed on display device 128. Preferably, pipe rectangle boundary indicators are displayed on display device 128 when Show Pipes option 240 is selected. The pipe rectangles are displayed on display device 128 preferably by X server 162. A display-enabling device for displaying the pipe rectangles on display device 128 is described in more detail herein especially with reference to FIG. 10. As shown in FIG. 6, each pipe rectangle 242 comprises four pipe rectangle boundary indicators—pipe rectangle left X 243, pipe rectangle right X 244, pipe rectangle top Y 245 and pipe rectangle bottom Y 246. In step 264, a determination of whether the user selected and moved one or more pipe rectangle boundary indicators 243-246 to change the pipe rectangle distribution to resize pipe rectangle 242 is made. If the user changed the pipe rectangle distribution, then the process starting at step 256 is repeated.

If the user does not change the pipe rectangle distribution, then in step 266, input regarding jitter parameters for one or more pipelines is received, preferably from the user and preferably by graphical software tool 230. The user may select jitter parameters, for example by manually entering them in command line prompt 234 (FIGS. 5A and 5B). However, in a preferred embodiment, the user selects jitter parameters by using graphical user interface 232 as described in more detail herein with reference to FIG. 8. Although, in the embodiment described herein the jitter parameters and pipe orientation and pipe distribution parameters are received in different steps, the invention is not so limited and if desired, the jitter parameters, the pipe orientation parameters and the pipe distribution parameters may be received in the same step.

In step 268, the state of the pipelines is updated to correspond to the jitter parameters. The pipelines may already be operating with preset default values. In step 268, software tool 230 converts the jitter parameters to a format suitable for GLX layer 172 and transmits the jitter parameters to GLX layer 172. GLX layer 172 updates the state of each of the pipelines with the jitter parameters.

Figure 8:
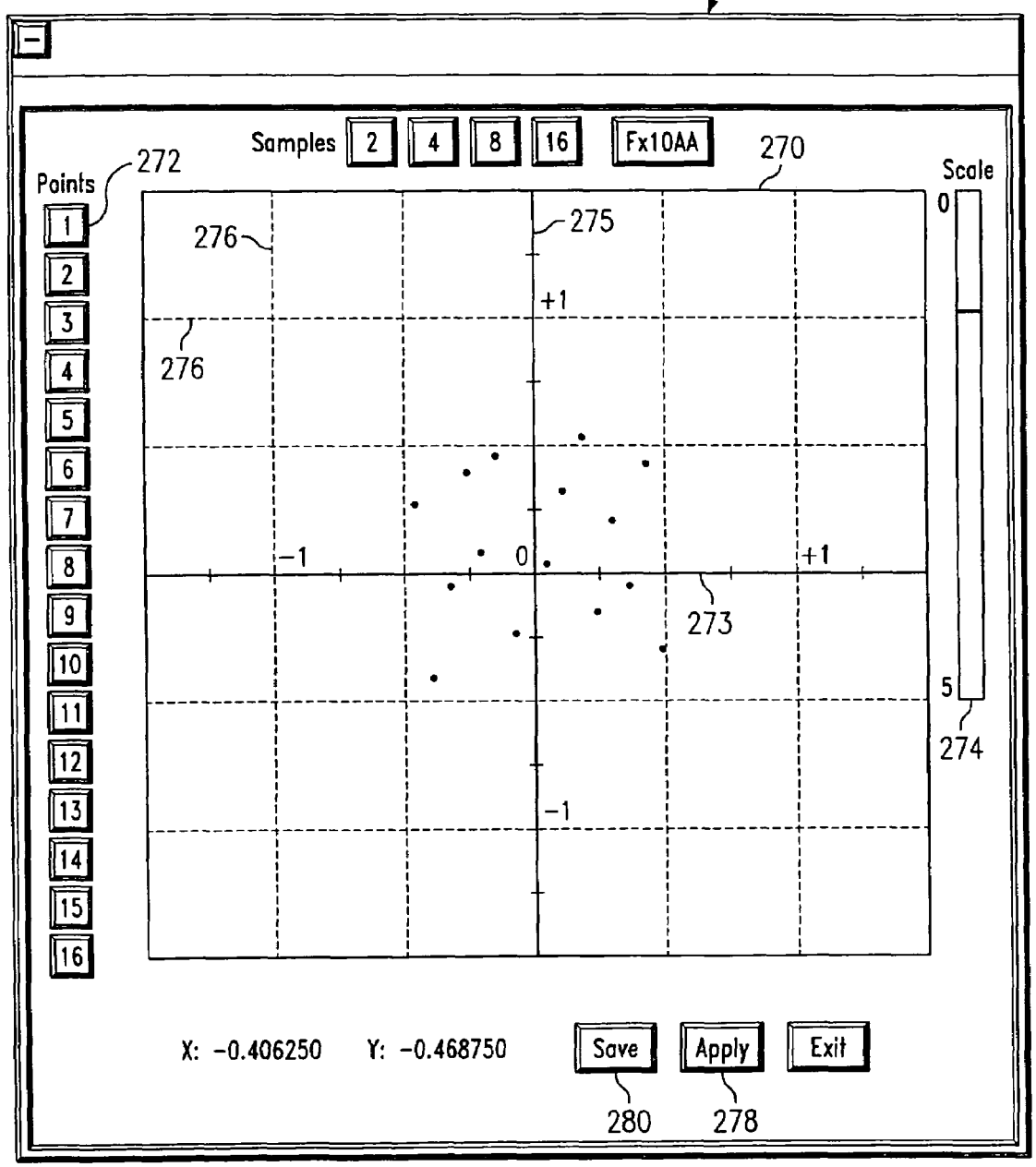
FIG. 8 is an exemplary screen display of the preferred embodiment graphical software tool for setting jitter parameters.

FIG. 8 is an exemplary screen display of graphical software tool 230 for setting jitter parameters. Graphical user interface 232 allows graphical manipulation and selection of jitter parameters for mixed or jitter modes of operation. Various parameters for jitter may be set or modified, such as jitter values, jitter scale, and/or the like. Jitter value comprises a pair of sub-pixel x-axis and sub-pixel y-axis offsets that a pipeline will use to slightly modify the destination pixel during 3D rendering. The number of jitter values defined is preferably equal to the number of jitter samples as selected utilizing sample icons 236a-236n of FIG. 5A. A jitter scale denotes the amount of scaling to be applied to all the jitter values.

Graphical user interface 232 as shown in FIG. 8 further comprises a jitter value window 270, a plurality of jitter point buttons 272 and a scale 274. Jitter value window 270 preferably comprises a grid 276. Grid 276 preferably comprises an X-axis 273 and a Y-axis 275 with the two axes meeting at the origin of grid 276, which origin is substantially at the center of jitter value window 270.

Each jitter point button 272 corresponds to a jitter value. The number of jitter point buttons 272 is preferably equal to the number of jitter samples selected by the user utilizing sample icons 236a-236n in FIG. 5A. A user may define a jitter value by selecting a corresponding jitter point button 272 and then selecting a point in jitter value window 270. If a jitter value is already associated with a point, the user may define a different jitter value for the point by clicking on a new area of jitter value window 270. The new location is then associated with the selected jitter point button 272. Once the user has defined jitter values, the user may scale the jitter values to bring them closer together or move them apart, for example by utilizing scale 274. If desired, other anti-aliasing techniques may be combined with the jitter samples and the result illustrated in jitter value window 270.

An Apply button 278 may be selected to transmit the jitter parameters to master pipeline 104 to update display device 128 in real time. The user may modify and update the jitter parameters until the image displayed on display device 128 attains a desired quality. A Save button 280 may be selected to store the defined jitter parameters in a file. The jitter parameters may be read from the saved file at a later time, if desired.

Compositor 126 preferably comprises a controller card (not shown) coupled to a plurality of input cards (not shown) via a communication bus (not shown). FIG. 9 is a flowchart 260 of a method for programming pipe rectangles 242 into compositor 126 in accordance with an embodiment of the present invention. In step 284, a counter, i, is initialized preferably to minus one (−1). In step 286, a determination is made as to whether any more slave pipelines 106-112 should be programmed. If no more slave pipelines are to be programmed, then the process starting at step 262 of FIG. 7 is executed. Otherwise in step 288, the counter is incremented. In step 290, the pipe rectangle data for pipe rectangle i is packetized, preferably by inserting the data into a predetermined data structure. In step 292, the packetized data is transmitted to the slave pipeline corresponding to pipe rectangle i. In step 294, the controller card addresses an input card corresponding to the slave pipeline. In step 296, the controller card delivers the packet using the communication bus to the corresponding input card. In step 298, pipe rectangle information is stored in the corresponding input card. The process starting at step 286 may then be repeated. The correspondence between a pipe rectangle and a slave pipeline is re-programmable. For example, pipe rectangle number 1 may initially be programmed to correspond to slave pipeline 106. However, if slave pipeline 106 becomes unavailable, then pipe rectangle number 1 may be reprogrammed, preferably "on the fly", to correspond to a different slave pipeline, for example slave pipeline 108.

FIG. 10 is a schematic diagram of a display-enabling device 300 for displaying pipe rectangles 242 on display device 128 in accordance with an embodiment of the present invention. Display-enabling device 300 is preferably part of compositor 126 (FIG. 1). However, the invention is not so limited and display-enabling device 300 may be separate from compositor 126. Display-enabling device 300 comprises a plurality, preferably four (one for each pipe rectangle boundary indicator of a pipe rectangle), of comparators 302, 304, 306, and 308. Compositor 126 of graphical display system 100 is constantly rendering the image on display device 128. Compositor 126 keeps track of the coordinate values for the current pixel being rendered. The x-coordinate value for the current pixel is stored in a x-position counter 310 and the y-coordinate value for the current pixel is stored in a y-position counter 312. The x-coordinate values for the left indicator 243 of the pipe rectangles is stored in a Pipe Rectangle Left X buffer 314, the x-coordinate values for the right indicator 244 of the pipe rectangles is stored in a Pipe Rectangle Right X buffer 316, the y-coordinate values for the top indicator 245 of the pipe rectangles is stored in a Pipe Rectangle top Y buffer 318, and the y-coordinate values for the bottom indicator 246 of the pipe rectangles is stored in a Pipe Rectangle bottom Y buffer 320.

Outputs of x-position counter 310 and Pipe Rectangle Left X buffer 314 connect to an input of comparator 302; outputs of x-position counter 310 and Pipe Rectangle Right X buffer 316 connect to an input of comparator 304; outputs of y-position counter 312 and Pipe Rectangle Top Y buffer 318 connect to an input of comparator 306; and outputs of y-position counter 312 and Pipe Rectangle Bottom Y buffer 320 connect to an input of comparator 308.

Display-enabling device 300 also comprises an OR gate 322 and a multiplexor 324. The output of comparators 302, 304, 306 and 308 connect to inputs of OR gate 322. The output of OR gate 322 connects to a control input of multiplexor 324. Multiplexor 324 is preferably a 2-to-1 multiplexor. Preferably, a first data input, for example a 0 input, of multiplexor 324 receives pixel data for the current pixel being rendered and a second data input, for example a 1 input, of multiplexor 324 receives pixel data for a pipe rectangle boundary indicator. Thus, when the output of OR gate 322 is zero, then output pixel data for the current pixel is equal to the input pixel data for the current pixel and when the output of OR gate 322 is one, then output pixel data for the current pixel is equal to the pipe rectangle boundary indicator pixel data.

The output of at least one of the comparators 302, 304, 306 and 308 and hence OR gate 322 is equal to 1 when at least one of the following conditions is true: i) the x-coordinate value of the current pixel matches the x-coordinate value for the left indicator of any of the pipe rectangles; ii) the x-coordinate value of the current pixel matches the x-coordinate value for the right indicator of any of the pipe rectangles; iii) the y-coordinate value of the current pixel matches the y-coordinate value for the top indicator of any of the pipe rectangles; or iv) the y-coordinate value of the current pixel matches the y-coordinate value for the bottom indicator of any of the pipe rectangles. In such a case, the output pixel data value is equal to the pipe rectangle boundary indicator pixel data value. If none of the above conditions is true, then the output pixel data value is equal to the input pixel data value. Thus, when the current pixel being rendered is on the boundary of a pipe rectangle, the pipe rectangle boundary indicator pixel data is displayed.

An advantage of the preferred embodiment of the present invention is that it enables user configurable load-balancing of graphics data between multiple pipelines in real-time. Thus, the user may change the orientation, distribution and jitter associated with different pipelines in real-time according to the image being displayed on the display device. The user does not have to start over when the user desires to change the configuration of the different pipelines. Moreover, the preferred embodiment of the present invention also interactively displays the pipe rectangles associated with different slave pipelines on the display device thereby enabling the user to interactively view the configuration of the different pipelines.

Although the preferred embodiment of the present invention has been described above with reference to a single display device, the invention is not so limited and if desired, the teachings of the present invention may be utilized with reference to multiple display devices. In such an embodiment, the multiple display devices may display different images unrelated to each other or the multiple display devices may act as a logical display device displaying different portions of the same image.

What is claimed is:

1. A method for configuring a plurality of graphics pipelines in a computer graphical display system, comprising:
    displaying a graphical user interface to enable a user to graphically specify at least one parameter for a plurality of pipe rectangles of said computer graphical display system, each of said plurality of pipe rectangles being associated with at least one of said plurality of graphics pipelines;
    receiving said at least one parameter; and
    updating a compositor of said computer graphical display system in real-time based at least in part on said at least one parameter.

2. The method of claim 1, wherein said at least one parameter is selected from the group consisting of an orientation parameter and a distribution parameter.

3. The method of claim 1, further comprising determining the number of graphics pipelines in said computer graphical display system.

4. The method of claim 1, wherein said displaying step comprises displaying said graphical user interface to enable said user to graphically select a number of jitter values used for said plurality of pipe rectangles.

5. The method of claim 4, further comprising enabling said user to graphically select said selected number of jitter values, wherein each jitter value comprises an x-offset value and a y-offset value.

6. The method of claim 1, wherein said displaying step comprises displaying said graphical user interface to enable said user to graphically select an orientation parameter for said plurality of pipe rectangles.

7. The method of claim 1, wherein said displaying step comprises displaying said graphical user interface to enable said user to graphically select a distribution parameter for said plurality of pipe rectangles.

8. The method of claim 1, further comprising generating coordinate values for each of said plurality of pipe rectangles based at least in part on said at least one parameter and at least in part on a screen size of a display device of said computer graphical display system.

9. The method of claim 8, further comprising updating a state of said plurality of graphics pipelines based at least in part on said generated coordinate values.

10. The method of claim 8, wherein said updating said compositor step comprises updating said compositor with said generated coordinate values.

11. The method of claim 1, further comprising displaying said plurality of pipe rectangles on said display device.

12. The method of claim 11, wherein said displaying step comprises displaying a pipe rectangle boundary indicator pixel data when a current pixel being rendered by said computer graphical display system is located on at least one of said plurality of pipe rectangles.

13. A method for configuring a plurality of graphics pipelines in a computer graphical display system, comprising:
    displaying a graphical user interface to enable a user to graphically specify at least one parameter for a plurality of pipe rectangles of said computer graphical display system, each of said plurality of pipe rectangles being associated with at least one of said plurality of graphics pipelines;
    receiving said at least one parameter;
    generating coordinate values for each of said plurality of pipe rectangles based at least in part on said at least one parameter and at least in part on a screen size of a display device of said computer graphical display system; and
    updating a compositor of said computer graphical display system in real-time based at least in part on said generated coordinate values.

14. The method of claim 13, further comprising displaying said plurality of pipe rectangles on said display device.

15. The method of claim 13, further comprising determining the number of graphics pipelines in said computer graphical display system prior to receiving said at least one parameter.

16. The method of claim 13, further comprising updating a state of said plurality of graphics pipelines based at least in part on said generated coordinate values.

17. A system for configuring a plurality of graphics pipelines in a computer graphical display system, comprising:
    a graphical user interface having a plurality of jitter sample icons, each of the plurality of jitter sample icons corresponding to a number of jitter values used for a plurality of pipe rectangles of the computer graphical display system.

18. The system of claim 17, wherein one of the jitter sample icons indicates no jittering of the plurality of pipe rectangles.

19. The system of claim 17, wherein a maximum number of jitter values to which a jitter sample icon of the plurality of jitter sample icons corresponds is not greater than a determined number of graphics pipelines.

20. The system of claim 17, further comprising another graphical user interface having a plurality of jitter point buttons, each jitter point button corresponding to a jitter value of the plurality of jitter values.

21. The system of claim 17, further comprising another graphical user interface having a jitter value window to enable a user to define a jitter value for at least one of the plurality of jitter values.

22. A system for configuring a plurality of graphics pipelines in a computer graphical display system, comprising:
   a graphical user interface having a plurality of orientation icons, each orientation icon corresponding to a different orientation of a plurality of pipe rectangles based at least in part on a number of graphics pipelines in the computer graphical display system.

23. The system of claim 22, the graphical user interface adapted to enable a user to graphically resize at least one of the plurality of pipe rectangles.

24. The system of claim 22, the graphical user interface adapted to display a plurality of pipe rectangle boundary indicators associated with the plurality of pipe rectangles.

25. The system of claim 24, the graphical user interface adapted to enable a user to graphically resize at least one of the plurality of pipe rectangles via selecting and dragging at least one of the pipe rectangle boundary indicators.

26. A system for configuring a plurality of graphics pipelines in a computer graphical display system, comprising:
   means for displaying a plurality of jitter sample icons, each of the plurality of jitter sample icons corresponding to a number of jitter values used for a plurality of pipe rectangles of the computer graphical display system.

27. The system of claim 26, further comprising means for displaying a plurality of jitter point buttons, each jitter point button corresponding to a jitter value of the plurality of jitter values.

28. A system for configuring a plurality of graphics pipelines in a computer graphical display system, comprising:
   means for displaying a plurality of orientation icons, each orientation icon corresponding to a different orientation of a plurality of pipe rectangles based at least in part on a number of graphics pipelines in the computer graphical display system.

29. The system of claim 28, further comprising means for enabling a user to graphically resize at least one of the plurality of pipe rectangles.

30. The system of claim 28, further comprising means for displaying a plurality of pipe rectangle boundary indicators associated with the plurality of pipe rectangles.

31. The system of claim 30, further comprising means for enabling a user to graphically resize at least one of the plurality of pipe rectangles via selecting and dragging at least one of the pipe rectangle boundary indicators.

* * * * *